Figure 7:
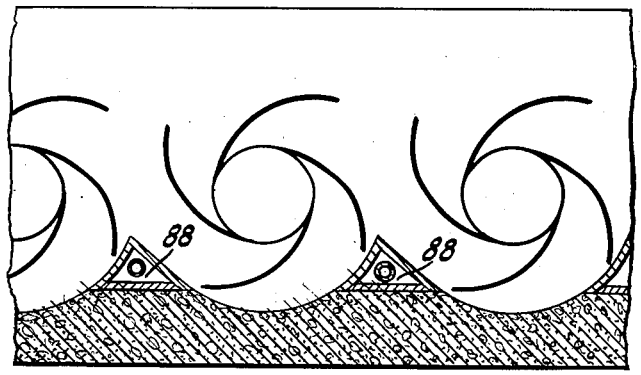

Feb. 12, 1952      A. B. KENNEDY      2,585,473
EXTRACTION APPARATUS AND METHOD
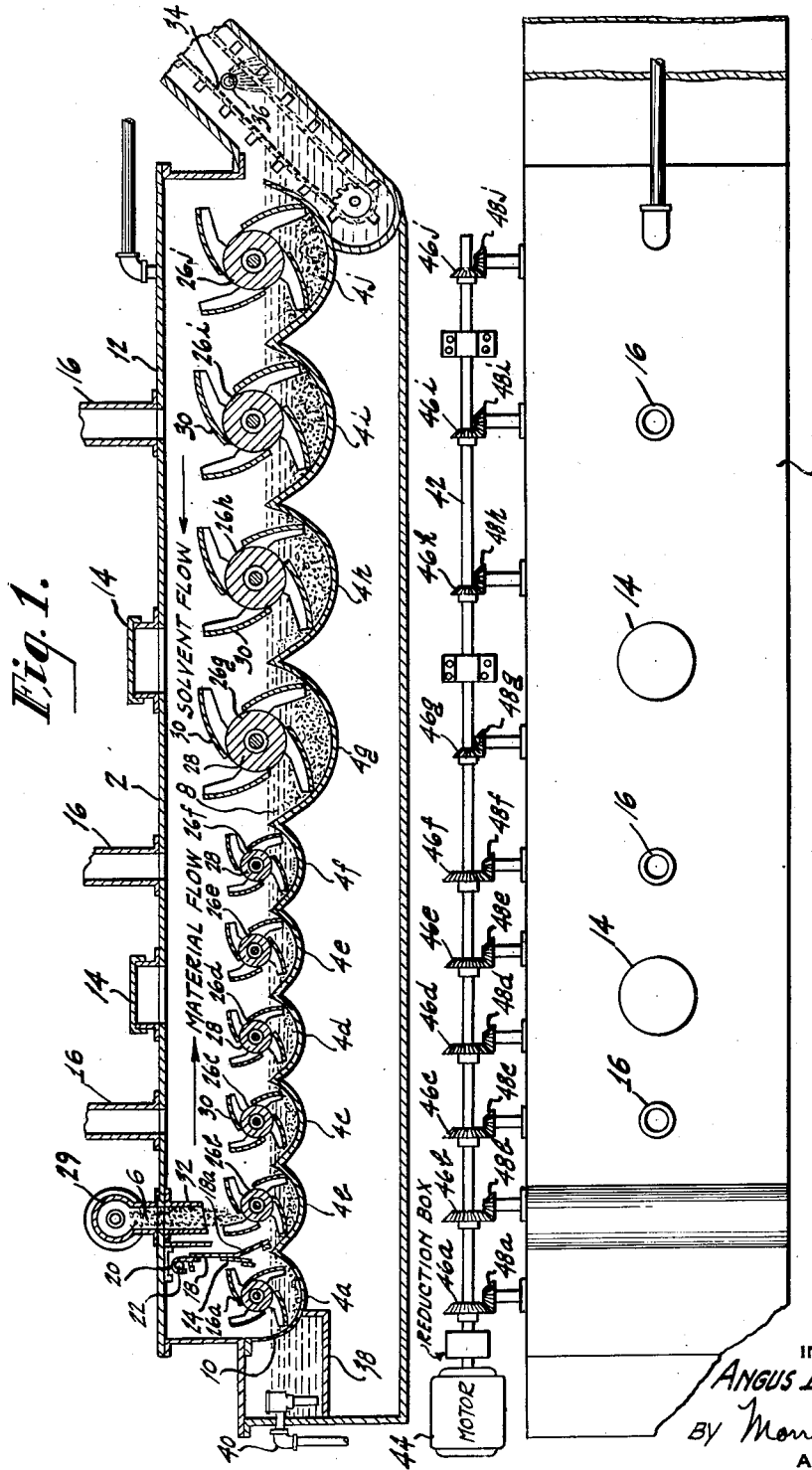
INVENTOR:
ANGUS B. KENNEDY
BY Morris Rabkin
ATTORNEY

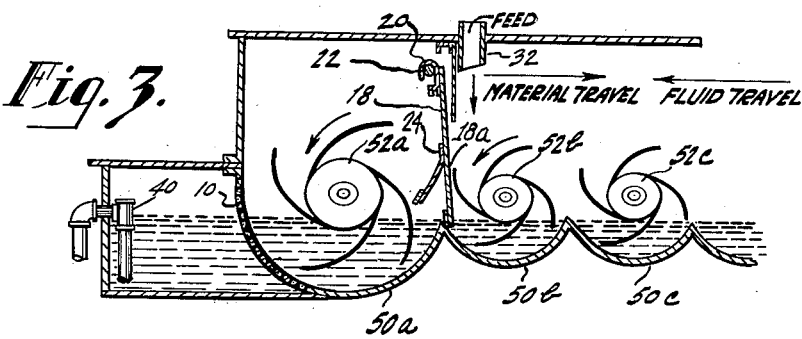
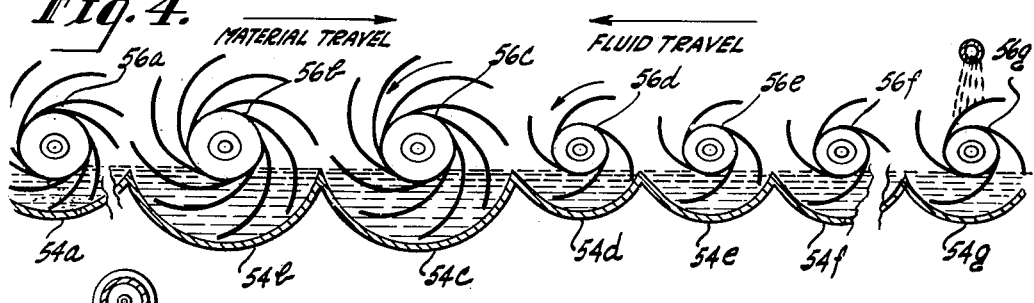
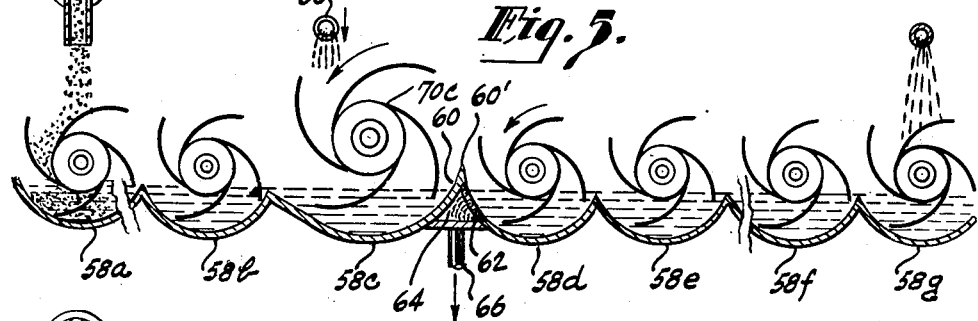
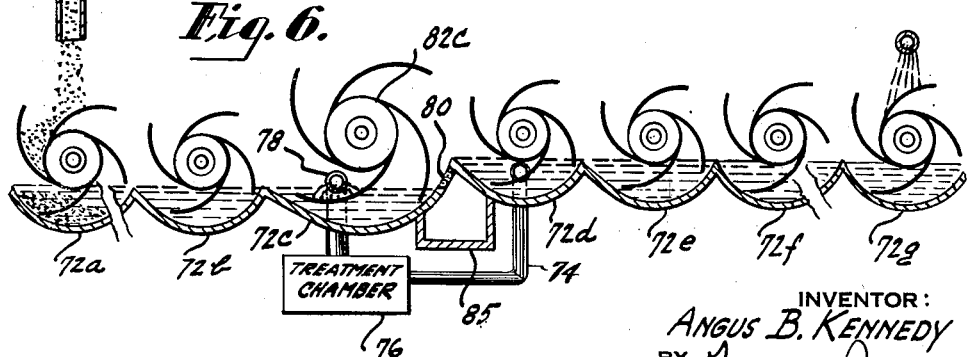

Patented Feb. 12, 1952

2,585,473

UNITED STATES PATENT OFFICE 2,585,473

EXTRACTION APPARATUS AND METHOD

Angus B. Kennedy, Cincinnati, Ohio, assignor, by decree of distribution, to Vera Alward Kennedy, Cincinnati, Ohio Application May 3, 1947, Serial No. 745,771

9 Claims. (Cl. 23—310)

This invention relates to continuous, countercurrent extraction apparatus of the general type shown in my United States Patents Nos. 1,628,787 and 2,405,105. More particularly, my present invention relates to improvements in the said apparatus whereby certain solid materials having soluble constituents not normally extractable at uniform rates through successive stages of treatment may be more efficiently handled.

Apparatus such as described in my above mentioned patents is suitable for the extraction of many different types of materials, such as the leaching of tannin, dyes, etc. from wood chips, bark root and other similar sources, the extraction of oils, fats, and greases from seeds, nuts and the like by means of organic solvents such as volatile petroleum hydrocarbons and chlorinated hydrocarbons, and so on.

It is a characteristic of some materials in particulate form having extractable, soluble constituents that they contain much of their soluble matter on or near the surface. This matter is capable of being extracted or washed off rapidly during the initial stages of extraction but, as extraction progresses, the rate of extraction slows down since more time is required for the solvent to penetrate and dissolve the soluble portions from within the solid particles.

Other solids have the exactly opposite characteristic that their soluble constituents are more highly concentrated in the interior rather than close to the surface with the result that the extraction rate is normally slow during the initial stages of treatment but becomes more rapid as the process continues.

To more efficiently treat material having the above characteristics and others which will be more fully explained hereinafter, the improvements in apparatus and methods constituting the present invention have been devised. The improvements relate to modifications in the apparatus described and claimed in my previously mentioned patents, which apparatus comprises, in general, a tank having a series of adjacent extraction sections or units through which the material to be subjected to treatment is successively passed in one direction while the solvent is caused to flow therethrough in the opposite direction, a paddle wheel in each section being arranged to feed the material through its own section and into the next succeeding section against the flow of liquid solvent. In this way, there is effected a continuous extraction of the soluble constituents from the solid particles.

The primary object of my present invention is to provide improved methods of and apparatus for extracting from solids soluble constituents therein which are capable of being more readily extracted during certain stages of extraction than during other stages.

Another object of my present invention is to provide improved apparatus for and methods of simultaneously extracting soluble constituents from separate portions of materials having substantially different percentages of said constituents.

Still another object of my present invention is to provide improved apparatus for and methods of extracting soluble constituents from material which is slow to respond to the action of the solvent during earlier stages of extraction, or vice versa.

A further object of my present invention is to provide improved apparatus for and methods of extracting two or more different soluble constituents from the same solid material by successive stages of treatment with different, selective solvents.

Still a further object of my present invention is to provide improved apparatus for and methods of treating solid materials in two or more stages using treating liquids which undergo physical or chemical changes during the treating process and must be modified in some manner after being used in one stage and before being admitted to the next stage.

Another object of my invention is to provide improved apparatus for and methods of fluid treating solid material in two or more stages including the removal of waste particles between stages.

Still another object of my present invention is to provide improved apparatus for treatment of solid materials with fluids, said apparatus including means for maintaining the treating fluid in a heated state.

It is also an object of my present invention to provide improved extracting apparatus as aforesaid which is relatively simple in construction and highly efficient in use.

The novel features of the invention are set forth with particularity in the appended claims. The invention, itself, however, both as to the organization thereof and the methods of operation, as well as additional objects and advantages thereof, will best be understood from the following description of certain embodiments thereof, when read in connection with the accompanying drawings, in which Figure 1 is a longitudinal sectional view of one form of improved apparatus according to my present invention, showing one arrangement of the extraction units, Figure 2 is a plan view of the apparatus of Figure 1 showing particularly the arrangement of the driving gears through which are driven propelling means associated with each extraction unit.

Figure 8:
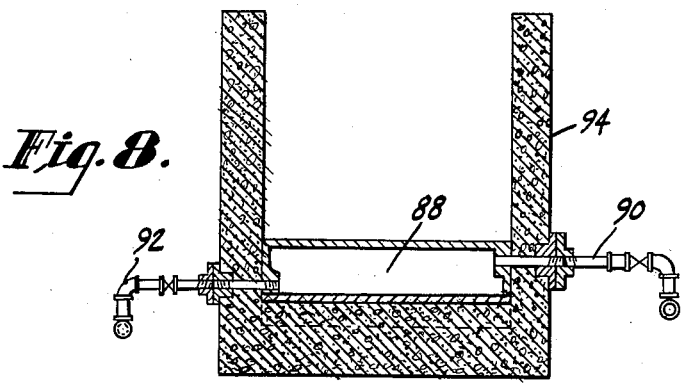
Figure 9:
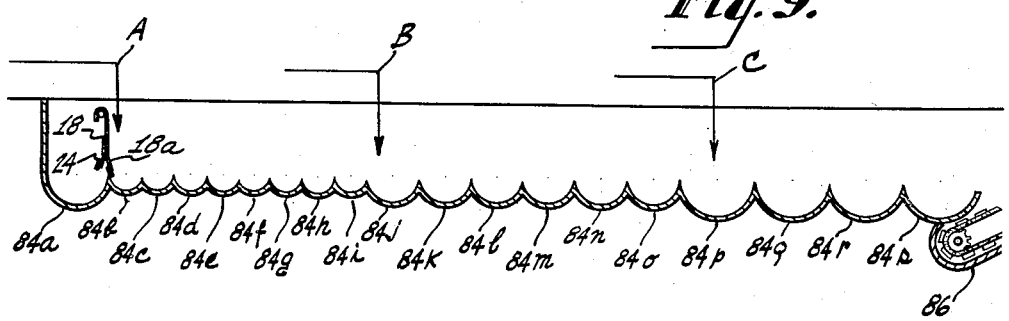

Figure 3 is a view partly in section and partly diagrammatic of a portion of a form of apparatus in accordance with my present invention which includes an enlarged filter section, Figure 4 is a similar view of another form of apparatus constructed according to my present invention, Figure 5 is a similar view of another form of apparatus according to my present invention embodying a two stage extraction apparatus, Figure 6 is a similar view of another embodiment of a two stage extraction apparatus constructed according to my present invention, Figure 7 is a similar view of a form of apparatus constructed according to my present invention, this form embodying an improved type of heating means, Figure 8 is a transverse sectional view taken along the line VIII—VIII of Figure 7, and Figure 9 is a diagrammatic, longitudinal, view of a section of still another embodiment of my present invention.

Referring more particularly to Figure 1, there is shown an enclosed chamber 2 in which there is provided a plurality of upwardly concave tubs 4a, 4b, 4c, 4d, 4e, 4f, 4g, 4h, 4i, 4j which extend across the entire width of the chamber in parallel relation to each other, the tubs being serially connected to form a continuous leaching or extraction apparatus and adjacent tubs having a common edge. These tubs constitute a plurality of extraction units in which particles of solid material 6, from which a soluble constituent is to be extracted by means of a fluid solvent 8, are subjected to the action of the fluid. The unit 4a is provided with a strainer 10 and constitutes primarily a filter section wherein the finer, lighter particles of material 6 are conditioned to remain in the fluid. The chamber 2 is also provided with a top 12 which may be formed with several preferably covered inspection openings 14 and one or more ventilating pipes 16 through which vapors generated during the treating process may escape. As described more particularly in my Patent No. 2,405,105, there may be provided between the filter section 4a and the first extraction section 4b a baffle plate 18 which is pivotally mounted by means of hinge straps 20 on a shaft 22. The lower end of the baffle plate 18 is bent at an angle to provide a flange 18a which extends into the tub 4b below the liquid level. Secured to the baffle plate 18 is a scraper 24 which extends into the filter section 4a.

The tubs 4b—4j constituting the extraction units in which the soluble constituents of the material 6 are dissolved out, as well as the filter unit 4a, are provided with individual paddle wheels 26a, 26b, 26c, 26d, 26e, 26f, 26g, 26h, 26i, 26j each of which extends across the full width of chamber 2 similarly to the tubs 4a—4j. Each paddle wheel is provided with a hub 28 from which extends the same number of curved, perforated blades 30 all spaced an equiangular distance apart on their respective hubs.

The paddle wheels 26a—26j rotate relative to their respective tubs in each unit and, in so doing, feed the solid material in each tub toward and into the next succeeding tub. The solid material 6 may be supplied to the extraction apparatus by a suitable conveyor, such as a screw conveyor 29, and is introduced into the system at the first extraction unit 4b through one or more delivery spouts 32.

The solid material introduced into the first extraction unit 4b is fed therethrough in discrete portions to the next unit 4c by the blades of the associated paddle wheel 26b. In the extraction unit 4c, the blades of the paddle wheel 26c pick up the discrete portions of solid material and completely immerse them in the solvent 8 while feeding them through the tub 4c to tub 4d. In being transferred from one tub to the next, the solid material is partially drained of solvent. In the tub 4d the blades of paddle wheel 26d pick up the partially drained portions in turn and so on until, finally, the last paddle wheel 26j advances the leached material out of the tub 4j and into a suitable conveyor 34, which passes out of the chamber in an upwardly inclined direction to discharge the residue. If the solid contents of all the tubs 4a—4j are displaced simultaneously, surges of solvent will occur through the extractor. The solvent may therefore not have sufficient contact time with the solid material in each tub and the extractive effect of the solvent may be impaired. To avoid this and to increase the extractive efficiency, the corresponding blades of successive paddle wheels may be displaced a small angular distance (for example, 10°) on their respective shafts, as disclosed more particularly in my above mentioned Patent No. 2,405,105.

The fluid solvent or other treating liquid 8 is introduced into the chamber 2 through a perforated spray pipe 36 or other fluid input means, preferably extending across the width of the chamber. The bottom of the chamber is preferably given a slight fall from tub 4j to tub 4a wherefore the solvent 8 will flow, by gravity, toward the tub 4a and in a direction opposite to that in which the solid material 6 is advanced from the tub 4a to conveyor 34.

When the solvent is first introduced at the material output end of the system through pipe 36, it may be said to be in its strongest condition since it is assumed to have as yet dissolved none of the soluble constituents from the solid material. As it flows from one tub to the next, dissolving more and more of the soluble constituents, it acquires progressively higher percentages of dissolved matter and thus its ability to dissolve more soluble matter becomes progressively less. The solid material to be treated is introduced into the end of the extraction apparatus opposite to that at which the solvent is admitted. The solid material, when first introduced into the extraction system, therefore first encounters solvent which has already dissolved perhaps a considerable amount of soluble substance and may not be able to dissolve much more. The dissolving power of the solvent may thus be said to be relatively weak. As the material 6 is advanced from tub to tub, it is treated with new portions of solvent with progressively stronger ability to dissolve soluble matter out of the solids. From this, it necessarily follows that, as the solid material becomes poorer in solubles, it is treated with stronger solvent, which is a requirement for most efficient extraction.

After travelling completely through the extraction system, the solvent passes through a strainer 10 in the filter unit 4a to enter a tank 38. From the tank 38 the solvent, laden with soluble matter, is withdrawn through a pipe 40.

Although the countercurrent extraction principle which has just been described is designed to equalize the rate of extraction throughout an extraction system, in practice it has been found that many types of materials have characteristics which result in an uneconomical extraction rate even when the counterflow principle is employed.

The present invention includes improvements in apparatus for and methods of extraction which considerably improve the extraction efficiency, especially when materials having certain characteristics are treated. For example, some solid materials in particulate form contain much oil or other soluble matter on or near the surface of the particles, and such solubles are readily washed off or extracted by the solvent during the early phases of extraction. With this type of material, the rate of extraction slows down as extraction progresses, since more time is required for the solvent to penetrate and extract the solubles from within the particles.

On the other hand, it is sometimes desired to process material which is, at first, slow to respond to the action of the solvent. Extraction proceeds faster after the liquid has partially disintegrated the solid material and has exposed a larger surface area to the direct attack of the solvent.

Referring to Figure 1, it will be noted that, according to the present invention, the tubs 4g, 4h, 4i and 4j have been made larger than the tubs 4a, 4b, 4c, 4d, 4e, and 4f and that the paddle wheels 26g, 26h, 26i and 26j of the larger tubs have also been made of correspondingly increased size. Means have also been provided for rotating the larger paddle wheels 26g, 26h, 26i, and 26j at a slower rate of speed than the smaller paddle wheels. Referring to Figure 2, a main driving shaft 42 is connected to a motor 44. The shafts of each of the paddle wheels 26a—26j are driven from the main shaft 42 through the bevelled driving gears 46a—46j. The driving gears associated with the smaller paddle wheels 26a—26f are larger in size and have more teeth than the driving gears associated with the larger paddle wheels 26g—26j. Since the driven gears 48a—48j associated with all the paddle wheels are all of the same size, it follows that, for each rotation of the driving shaft 42, the larger driving gears 46a—46f will drive their respectively associated driven gears 48a—48f through more rotations that will be imparted to the driven gears 48g—48j by their respectively associated smaller driving gears 46g—46j and hence the smaller paddle wheels will rotate more rapidly than the larger ones. Although any ratio in relative rotational speed may be provided by varying the gear ratios, for example, it is preferred to make the rotational speed of the large paddle wheels roughly inversely proportional to the size of the large paddle wheels compared to the size of the smaller paddle wheels. In this manner, the solid material may be given a longer period of contact with the solvent in each larger unit than in each smaller unit and the relative time of contact will thus be directly proportional to the size of the unit. This is necessary in order to insure a constant ratio of material input to material output in the system. As an example, the tubs 4g—4j may be made double the size of tubs 4a—4f. The gears 46a—46f in this case are double the size of the gears 46g—46j. The rotational speed of paddle wheels 26g—26j is thus one-half that of paddle wheels 26a—26f but the rate of output of leached material to the conveyor 34, which is the material output end of the apparatus, may thus be made the same as the rate of material input from the delivery spout 32, which is the material input end of the apparatus.

It should be understood that this part of the invention is not limited to the total number of extraction units shown in Figure 1 nor to the relative number of larger and smaller units illustrated. The relative number and the relative size may be adjusted to accommodate the characteristics of the material being treated.

My Patent No. 2,405,105 describes and claims an improvement in a filtering means especially designed to be used with an extractor of the type described in connection with the present invention. Figure 3, which illustrates the material input end of an extraction apparatus of the general type hereinbefore described, shows how the present invention may be used to increase the efficiency of the said filtering means. A filter section 50a corresponds to the section 4a shown in Figure 1 while tubs 50b and 50c constitute the first two extraction units of a system which may be of any desired length. These units contain paddle wheels 52b and 52c. The filter section 50a may be made of relatively larger size than the size of the extraction units 50b and 50c in order that the fines which are usually present in certain types of material to be treated may have a longer time to settle and form a sludge. This results in a relatively larger proportion of fines being intercepted and returned to the extraction tub 50b by the paddle wheel 52a in the filter section.

Figure 4 shows part of an extraction system in which the tubs of a series adjacent the material input end of the apparatus, of which only three tubs 54a, 54b, and 54c are shown, are larger than the tubs toward the material output end of the apparatus. Four of the smaller tubs 54d—54g in the series having the smaller size tubs are shown but this series may contain as many units as desired. With driving means such as illustrated in Figure 2, or by other speed regulating means, the larger sized paddle wheels 56a—56c are driven more slowly than the paddle wheels 56d—56g, thus allowing a longer treating period in the larger units than in the smaller ones. The relative length of the treating times in the several units is preferably directly proportional to the relative sizes of the tubs. In order that the amount of solid material delivered at the material output end of the system be made the same as the amount introduced at the material input end, the paddle wheels such as 56a—56c are provided with a larger number of blades than the smaller paddle wheels. As an example, if the tubs 54a—54c are of twice the capacity of tubs 54d—54g, the paddle wheels 56a—56c are preferably constructed with double the number of blades carried by paddle wheels 54d—54g. The provision of a larger number of blades on each of the larger size paddle wheels also allows the size of the portion of solids propelled by each blade to be reduced so that the amount delivered to each blade in the smaller units will be small enough to be properly accommodated by their smaller capacity.

Another feature of the present invention is illustrated in Figure 5. This figure shows part of an extraction system in which solid material may be subjected to two different stages of treatment, different solvents being used in each stage. In this figure, the tub 58a constitutes the material input end of an extraction system, the tubs 58b and 58c constitute the last two of a group of treating units in one stage, the tubs 58d and 58e constitute the first two treating units of the succeeding stage and the tubs 58f and 58g are the last two units of this stage. Between one stage and the next, the separating wall 60 is extended up above the normal liquid level in the tubs so that the common edge 60' is at an appreciable height above the liquid surface, thereby creating a damming effect. By means of a screen 62 placed in the end wall of the tub 58d, solvent is withdrawn into a collecting tank 64 and thence is drawn off through a pipe 66 to keep it from flowing over to the next group of tubs in the preceding treating stage. Solvent for this preceding stage is introduced into the tub 58c by means of a spray pipe 68. Although the dam created by the wall 60 is sufficiently high to prevent solvent from flowing from one stage to the next, the last unit 58c of the first treating stage is made sufficiently large to accommodate a paddle wheel 70c having blades long enough to lift each portion of the partially leached solid material completely out of the liquid in the tub 58c, drain it of much of its adhering solvent, and push it over into the tub 58d where it begins its passage through the next treating stage. While only two treating stages have been illustrated, it will be understood that the invention includes the use of any desired number of them.

Instead of using different solvents or other treating liquids in different treating stages of a multi-stage treating process, it may be desired to remove the solvent at the fluid output end of each stage, subject it to some treatment, and return it to the fluid input end of another treating stage. One form of apparatus for carrying out this process is shown in Figure 6. Here, part of an extraction system is shown having tubs 72b and 72c constituting the end of a group of units making up one treating stage, and tubs 72d and 72e constituting the beginning of a group of units comprising a succeeding treating stage. For convenience in providing a "head" of pressure, the tubs 72d and 72e, as well as all remaining tubs of this group represented by tubs 72f and 72g, are placed at a higher level than the tubs 72a—72c and the remaining tubs of the other group. Treating liquid is withdrawn from the tub 72d through an outlet pipe 74 from which it passes into a treatment chamber 76 where it may undergo any desired treatment, after which it is introduced into the tub 72c through a pipe 78 to be used in the earlier treating stage. The treatment to which the liquid may be subjected in the chamber 76 is incidental to the present invention. By way of example, this may consist of neutralizing acids or alkalies picked up by the treating liquid in the treating stage represented by the tubs 72d—72g, the addition of more catalysts to replace spent reagents, etc. Since it frequently happens that waste material or other unwanted fines may still be present on the surface of the solid particles after passing through the first treating stage, a strainer or coarse grid 80 may be made a part of the curved bottom of the last tub 72c of the first stage, this strainer being placed above the liquid level so that, as the blades of paddle wheel 82c lift the solids from one stage to the next, the materials are passed across the screen and the fines can drop through to be collected in a hopper 85. As in the preceding modification described above, the solvent is prevented from flowing directly from one stage to the next, but the passage of the solids being treated is unimpeded. The solids are, moreover, partially drained of liquid during the transfer operation. In order to lift the solids from the lower to the higher level, the last unit 72c of the first treating stage is made larger than the remaining units and the blades of the paddle wheel 82c are made correspondingly longer.

It is sometimes desired to extract soluble material simultaneously from two or more lots of solids having widely different percentages of soluble constituents therein due to some of the material already having had part of its solubles extracted by other processes. Heretofore, the extraction has usually been accomplished by mixing all the material together and running it through an extractor. Obviously, this is inefficient since, as previously explained, a material which has already had a considerable percentage of its soluble constituents removed from the surface portion responds with increasing difficulty to solvent action as treatment progresses. The apparatus is therefore required to treat a mixture of material of widely varying extraction rate characteristics. If the rate of treatment is adjusted to extract soluble material most efficiently from the material high in soluble content, that of low content will not be properly processed and much of the soluble constituent may remain unreclaimed. On the other hand, if the extraction rate is adjusted to most efficiently leach the material having a lower percentage of solubles, much solvent will be wasted, or at least much additional solvent will have to be run through the subsequent solvent recovery process with an inevitable accompanying rise in cost of operation.

With apparatus constructed according to the present invention, the above problem may be solved quite satisfactorily and with the most efficient use of solvent by means of apparatus such as shown in Figure 9. This extraction apparatus has different sizes of extraction units or tubs according to the general description given in connection with the apparatus of Figure 1. In Figure 9, there are shown stations A, B, and C at which different lots of material may be introduced to be treated simultaneously. A filter unit 84a is provided adjacent the first material input station of the apparatus, extraction units 84b—84i each of a predetermined capacity constituting one treating group or stage, units 84j—84o, twice as large, for example, as the units 84b—84i constituting a second treating stage, and units 84p—84s which may be twice as large, for example, as units 84j—84o comprising a third treating stage. A conveyor unit 86 completes the material output end of the apparatus.

As an example of operation, the extractor may be required to extract oil from 50 tons of ground castor beans containing a full oil content of 50 percent. The same extractor may also be required to extract oil simultaneously from an additional 50 tons of ground castor beans from which a large portion of the oil has been removed in hydraulic presses or expellers, so that the residual oil content is only 20 percent. Naturally, the high oil content material requires a relatively more extensive extraction treatment than the material of low oil content. Therefore, the high oil content material is introduced at a suitable rate at station A and started through the extractor. Assuming that, after having passed through eight extraction units, the first material has had its oil content reduced to 20 percent, the other 50 tons of low oil content material can then be introduced at a desired rate at the station B adjacent the ninth extraction unit and both lots of material then run through the remaining units mixed together. These remaining units should, of course, be larger in size to accommodate the increased volume of solids. Still larger extraction units are provided in a third treating stage beginning at station C, which units may be used either to compensate for the decreased rate of extraction which occurs in this type of material as treatment progresses or to treat a third lot of material of still lower oil content. If the material is not of a type from which it becomes increasingly difficult to extract the soluble constituents as time of treatment increases and if only two lots of differing oil content are to be treated, the last section $84p$—$84s$ may be made of the same size as units $84j$—$84o$. This same principle may be applied to the extraction of any desired number of lots of material, each lot of which has a different percentage of soluble constituent to be removed. The lot having the highest content of solubles is introduced first at the end of the apparatus adjacent the solvent output station, and the second lot is introduced into the unit at which the percentage of solubles in the first lot has decreased to about that present in the second. Both of these are then run through together into succeeding units with their soluble constituents decreasing steadily in percentage as the treatment proceeds. A third lot may be introduced into a unit at which the percentage of solubles in the first two lots has dropped to its own level, and so on.

With any of the modifications of the invention hereinbefore described, it may be desirable to maintain the liquid in the extraction units at an elevated temperature to increase the rate of extraction. It has been found convenient to supply this heat with steam. As shown in Figs. 7 and 8, an improved heating arrangement according to the present invention includes triangular steam chests 88 each having a steam supply pipe 90 and a drain pipe 92. This type of heating unit has been found especially effective when the extraction units and chamber side walls 94 are constructed of concrete. The steam chests are positioned within the apex of the curved space between each pair of tubs, this curved space being otherwise dead space remaining between the convex, outwardly curved end walls of each pair of tubs. Although this type of heater is conveniently used with tubs having the shape illustrated, its use is by no means so limited. Steam chests of a similar nature but different in shape may be used with extractor systems having individual extraction tanks so placed that they form a series with their end walls adjoining when these tanks are of any shape desired.

From the foregoing description, it will undoubtedly be apparent to those skilled in the art that I have provided various improvements in extraction or leaching apparatus wherein solids of various types may be treated with one or more fluid treating agents. While these improvements have particular utility in extracting oils from vegetable products, such as ground cocoa beans or castor beans, they are also very well suited for use in many other specific treating processes, such as the treating of oranges with dilute hydrochloric acid in order to remove unsightly extraneous matter from their rinds. Other applications will, no doubt, also readily suggest themselves to those skilled in the art. Moreover, various changes in and modifications of the particular forms of my invention disclosed herein, as well as other embodiments thereof, all falling within the spirit of the present invention, will undoubtedly suggest themselves. I therefore desire that my invention shall not be limited except insofar as is made necessary by the prior art and by the spirit of the appended claims.

I claim:

1. A method of extracting soluble constituents from different portions of materials having different percentages of said soluble constituents therein, said method comprising subjecting a first portion of said materials having the highest of said different percentages of said soluble constituents to successive stages of extraction with progressively stronger portions of solvent whereby the percentage of said soluble constituents in said portion after each stage is progressively lower, adding to said first portion at various of said successive stages additional portions of material having percentages of soluble material substantially the same as those remaining in said first portion at the beginning of said stages, and subjecting the now larger portions of said material to correspondingly larger and progressively stronger portions of said solvent until a further desired percentage of said soluble constituents has been extracted.

2. A method of extracting soluble constituents from different portions of materials having different percentages of said soluble constituents therein, which materials have the characteristic that their soluble constituents are capable of being extracted by a solvent less rapidly as the time during which the material has been subjected to the solvent increases, said method comprising subjecting a first portion of said material having a relatively higher percentage of said soluble constituents to successive immersions in new portions of said solvent until its percentage of said soluble constituents has decreased to substantially a predetermined value, adding to said first portion a second portion of said material having a percentage of said soluble constituents substantially the same as said predetermined value, and subjecting both said first and second portions to correspondingly larger new portions of said solvent, at least some of said immersions being for increasing lengths of time as the extraction treatment progresses.

3. In a continuous extraction apparatus of the counter-current type in which discrete portions of material containing an extractable, soluble constituent are introduced at one end and are propelled toward the opposite end and in which a solvent is introduced at said opposite end and caused to flow through said apparatus counter to the direction of travel of said material, a plurality of extraction units comprising (1) a plurality of tubs having bottom portions of varied lengths constituting sections of said apparatus, adjacent tubs within each section having a common edge constructed to permit the flow of solvent in one direction through and over the tubs of each unit, and (2) a rotatable paddle wheel in each of said tubs for successively immersing in the solvent therein and propelling to the next succeeding tub successive portions of said material, said paddle wheels having blades arranged to sweep said tub bottoms and thereby move said portions in a generally transverse direction thereover, separate driving means associated with each of said paddle wheels, and power means operatively connected to all of said driving means for rotating the paddle wheels in the larger size tubs at a lower number of R. P. M. than the paddle wheels in the smaller size tubs such that said portions of material are immersed in the solvent in the respective tubs for a length of time directly proportional to the lengths of said bottom portions while the rate of output of said material at the output end of the apparatus is substantially the same as the rate of input of said material to said apparatus.

4. Extraction apparatus according to claim 3 characterized in that said tub bottom portions are of graduated sizes, the largest one being adjacent the end of said apparatus at which the solvent is introduced.

5. Extraction apparatus according to claim 3 characterized in that said tub bottom portions are of graduated sizes, the largest one being adjacent the material input end of said apparatus.

6. Extraction apparatus according to claim 3 characterized in that said tubs are arranged in groups, the tubs of one group having bottom portions of different lengths than the tubs of another group, and characterized further by the addition of a barrier between each of said tub groups positioned to prevent direct flow of solvent between said groups but to permit transfer of said material from one of said groups to the next succeeding group.

7. In a continuous extraction apparatus in which discrete portions of material containing an extractable, soluble constituent are introduced at one end of said apparatus and are propelled toward the opposite end and in which a solvent is introduced at said opposite end and caused to flow through said apparatus counter to the direction of travel of said material, a plurality of adjacent tubs constituting sections of said apparatus, said tubs being of graduated sizes the largest of which is adjacent the material input end of said apparatus, adjacent ones of said tubs having a common edge constructed to permit the flow of solvent in one direction through and over said tubs, paddle wheels rotatably mounted one within each tub for immersing in the solvent therein and propelling forward successive portions of material, said paddle wheels being also of graduated sizes in correspondence with their respectively associated tubs with the largest paddle wheel in the largest tub and vice versa, the number of blades on the respective paddle wheels being directly proportional to the relative sizes of the tubs associated therewith, and means for regulating the speed of rotation of all of said paddle wheels such that said portions of material are immersed in the tubs for lengths of time directly proportional to the sizes of the tubs.

8. In a continuous extraction apparatus of the counter-current type in which solids having soluble constituents to be extracted are introduced adjacent one end of the apparatus and solvent liquid adjacent the other, a series of successive, adjacent extraction tubs having a common edge over which the material is passed in being transferred from one tub to another, a paddle wheel in each said tub having blades arranged to sweep the bottom thereof and thereby feed the solid material therein to the next succeeding tub against the flow of liquid therein, and means connecting and constituting part of each adjacent pair of said tubs for heating the contents therein, said heating means comprising steam chests and means for admitting steam thereto.

9. In a continuous extraction apparatus of the counter-current type in which solids having soluble constituents therein are introduced adjacent one end of the apparatus and solvent liquid adjacent the other, means providing a chamber having side walls, a series of extraction units in said chamber comprising tubs having end walls extending between said side walls and curved convex outwardly, said tubs being positioned so that an end wall of one tub is positioned adjacent an end wall of the next succeeding tub, a rotatable paddle wheel in each of said tubs for advancing through each tub and to the next succeeding tub the solid material therein, and a steam chest positioned within the apex of the curved space between each pair of said tubs for reception of steam for heating the contents of said tubs.

ANGUS B. KENNEDY.

REFERENCES CITED

The following references are of record in the file of this patent:

UNITED STATES PATENTS

| Number | Name | Date |
|---|---|---|
| 1,628,787 | Kennedy | May 17, 1927 |
| 2,282,265 | Swellen | May 5, 1942 |
| 2,397,973 | Mueller | Apr. 9, 1946 |
| 2,405,105 | Kennedy | July 30, 1946 |

OTHER REFERENCES

Badger and McCabe, Elements of Chemical Eng., 1936, pp. 434–436.